US012719747B2

(12) United States Patent
Teshome et al.

(10) Patent No.: US 12,719,747 B2
(45) Date of Patent: Aug. 25, 2026

(54) MANAGING OPERATION OF AN ENDPOINT DEVICE USING OUT OF BAND METHODS

(71) Applicant: Dell Products L.P., Round Rock, TX (US)

(72) Inventors: Abeye Teshome, Austin, TX (US); Richard M. Tonry, Georgetown, TX (US); Adolfo Sandor Montero, Pflugerville, TX (US); Bassem El-Azzami, Austin, TX (US); Rajaravi Chandra Kollarapu, Allen, TX (US); Vinodkumar Vasudev Ottar, McKinney, TX (US); Luis Antonio Valencia Reyes, Waxahachie, TX (US); Mohit Arora, Frisco, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/649,186

(22) Filed: Apr. 29, 2024

(65) Prior Publication Data

US 2025/0337646 A1 Oct. 30, 2025

(51) Int. Cl.

*G06F 15/177* (2006.01)
*H04L 41/082* (2022.01)
*H04L 41/0893* (2022.01)

(52) U.S. Cl.

CPC ........ *H04L 41/082* (2013.01); *H04L 41/0893* (2013.01)

(58) Field of Classification Search

CPC ... H04L 41/0893; H04L 41/082; H04L 67/34; H04L 67/30; G06F 2201/865; G06F 8/65

See application file for complete search history.

(56) References Cited

U.S. PATENT DOCUMENTS 8,042,182 B2 * 10/2011 Milani Comparetti ...................... H04L 63/1408 713/153
8,615,785 B2 * 12/2013 Elrod ................. H04L 63/0227 713/192
8,924,620 B2 * 12/2014 Harriman ............. G06F 1/3203 370/254
9,215,244 B2 * 12/2015 Ayyagari ........... H04L 63/1425

(Continued)

FOREIGN PATENT DOCUMENTS

WO WO-2024058690 A1 * 3/2024 ........... H04L 43/065

*Primary Examiner* — Suraj M Joshi
*Assistant Examiner* — Hao H Nguyen
(74) *Attorney, Agent, or Firm* — WOMBLE BOND DICKINSON (US) LLP

(57) ABSTRACT

Methods and systems for managing operation of endpoint devices are disclosed. To manage the operation of the endpoint devices, an endpoint device may include an out of band management controller. An update event may occur for the endpoint device and, in response to the update event, an action set may be dynamically synthesized to update the endpoint device. The action set may be dynamically synthesized based on telemetry information, subscription information, and a goal operating state for the endpoint device. The telemetry information may indicate hardware components of the endpoint device and the subscription information may indicate services that are to be provided to a user of the endpoint device. The action set may be used to initiate updating of the endpoint device.

20 Claims, 6 Drawing Sheets

(56) References Cited

U.S. PATENT DOCUMENTS

| | | | | |
|---|---|---|---|---|
| 9,734,169 | B2 * | 8/2017 | Redlich | G06F 16/21 |
| 10,176,308 | B2 * | 1/2019 | Mintz | H04L 9/3297 |
| 10,298,670 | B2 * | 5/2019 | Ben-Shaul | G06F 3/0635 |
| 10,671,765 | B2 * | 6/2020 | Swierk | G06F 21/86 |
| 10,791,421 | B1 * | 9/2020 | Rothschild | G06F 16/909 |
| 11,036,902 | B2 * | 6/2021 | Nicholas | G05B 13/048 |
| 11,102,122 | B2 * | 8/2021 | Seed | H04L 67/14 |
| 11,134,380 | B2 * | 9/2021 | Fox | H04W 4/40 |
| 11,487,274 | B2 * | 11/2022 | Valder | H04L 67/34 |
| 11,792,267 | B2 * | 10/2023 | Kreiner | H04L 67/12<br>709/203 |
| 12,020,302 | B1 * | 6/2024 | Chud | G06Q 30/0601 |
| 12,243,420 | B1 * | 3/2025 | Rothschild | G08G 1/096775 |
| 2011/0087387 | A1 | 4/2011 | Safa-Bakhsh et al. | |
| 2013/0305357 | A1 * | 11/2013 | Ayyagari | H04L 41/069<br>726/22 |
| 2014/0063344 | A1 | 3/2014 | Dureau | |
| 2017/0150305 | A1 | 5/2017 | Chaudhri | |
| 2017/0242688 | A1 * | 8/2017 | Yu | H04L 67/34 |
| 2017/0366606 | A1 * | 12/2017 | Ben-Shaul | G06F 3/061 |
| 2018/0039946 | A1 * | 2/2018 | Bolte | G06Q 50/2057 |
| 2018/0314809 | A1 * | 11/2018 | Mintz | G06F 21/105 |
| 2020/0379741 | A1 * | 12/2020 | Vidnovic | G06F 21/44 |
| 2021/0034048 | A1 | 2/2021 | Hajizadeh | |
| 2021/0073211 | A1 * | 3/2021 | Wright, Sr. | G06F 16/2379 |
| 2022/0038659 | A1 * | 2/2022 | Michel | H04N 7/17318 |
| 2022/0276931 | A1 * | 9/2022 | Chen | G06F 11/366 |
| 2023/0104026 | A1 * | 4/2023 | Matli | H04N 21/26606<br>725/28 |
| 2025/0138913 | A1 * | 5/2025 | Beyerlein | G06F 9/542 |

* cited by examiner

MANAGING OPERATION OF AN ENDPOINT DEVICE USING OUT OF BAND METHODS

FIELD

Embodiments disclosed herein relate generally to managing operation of endpoint devices. More particularly, embodiments disclosed herein relate to systems and methods to manage operation of an endpoint device using out of band methods.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
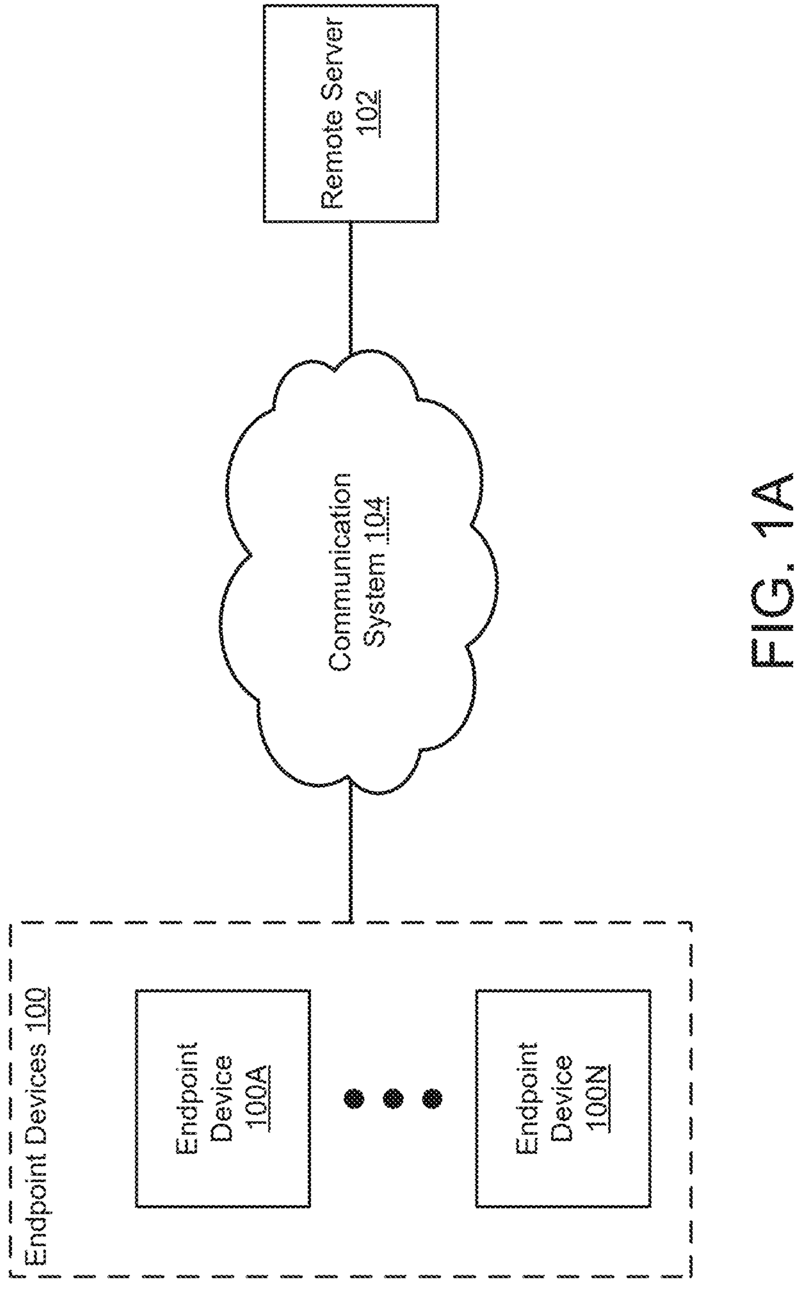
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing endpoint devices. The endpoint devices may provide computer-implemented services. The computer-implemented services may include any quantity and type of such services.

To provide the computer-implemented services, the endpoint devices may need to operate in a predetermined manner conducive to, for example, execution of applications hosted by the endpoint devices that provide the computer-implemented services. The applications may utilize certain configurations of hardware resources and/or software resources to provide the desired computer-implemented services.

Different endpoint devices may perform different computer-implemented services based on, for example, hardware components of the endpoint devices, the configurations of the hardware and/or software resources, active subscriptions for software, etc. The computer-implemented services provided by an endpoint device may also change over time due to occurrences of update events for the endpoint device. An update event may occur, for example, in response to a change in a subscription (e.g., for a software application) by a user of the endpoint device.

To respond to the update event, the endpoint device may obtain various data structures (e.g., executable computer code included in software installation packages, patches, instructions to modify configurations, etc.). A management agent (e.g., a management software component, a management entity) hosted by hardware resources of the endpoint device may perform actions to update operation of (e.g., an operating state of) the endpoint device based on the provided data structures and/or other information obtained by the management agent. To do so, the management agent may perform operations to install software, modify configurations of hardware and/or software components, manage ownership vouchers, and/or otherwise modify the operation of the endpoint device.

However, if the management agent is unable to modify the operation of the endpoint device, the computer-implemented services provided by the endpoint device may be interrupted, unavailable, and/or otherwise negatively impacted. The management agent may be unable to modify the operation of the endpoint device due to: (i) the hardware resources of the endpoint device being depowered, (ii) one or more actions (e.g., installing a software application) being incompatible with available hardware components, software components, and/or security limitations of the hardware resources, (iii) compromise of the hardware resources (e.g., malware preventing updates to the endpoint device), and/or (iv) other reasons.

To update the operation of the endpoint device without transmission of data over potentially depowered and/or compromised in band components of the endpoint device, the endpoint device may include a management controller (e.g., an out of band component). To increase a likelihood of successfully updating the operation of the endpoint device, the remote server may interact with the management controller via an out of band communication channel that does not traverse in band components and/or in band communication channels. In addition, the management controller may be positioned in a separate power domain from the in band resources and, therefore, may remain powered if the hardware resources are depowered.

To increase a likelihood of performing timely updates to the operation of the endpoint device by the management controller, the remote server may obtain an endpoint device profile from the management controller. The endpoint device profile may include: (i) telemetry information for the endpoint device, (ii) information related to the user of the endpoint device, and/or (iii) other information. The remote server may also obtain a goal operating state for the endpoint device (e.g., desired access to software, desired configurations, other desired functionalities).

The remote server may utilize the endpoint device profile and the goal operating state to synthesize an action set. The action set may be provided to the management controller via the out of band communication channel and the management controller may initiate performance of the action set to update the operation of the endpoint device.

To synthesize the action set, the remote server may utilize the information related to the user (e.g., from the endpoint device profile) to obtain subscription information for the endpoint device. Based on at least the telemetry information and the subscription information, the remote server may exclude one or more possible actions from the action set. This may occur due to, for example, desired updates that may be incompatible with hardware components of the hardware resources, desired software applications for which the user does not have an active subscription, etc. The remote server may then synthesize an action set usable to modify the operating state of the endpoint device so that a difference between a resulting operating state (e.g., following performance of the action set) and the goal operating state is reduced.

Therefore, operation of the endpoint device may be dynamically updated in response to subscription changes using out of band methods. Following an update event for the endpoint device, the remote server may verify user subscriptions, consider hardware resource constraints, and/or perform other actions as part of an action set synthesis process. By doing so, updates to the endpoint device may be more likely to be completed regardless of a power or compromise state of the hardware resources of the endpoint device. Consequently, a likelihood of the computer-implemented services being provided by the endpoint device as desired by a user of the endpoint device may be increased.

In an embodiment, a method of managing operation of an endpoint device is provided. The method may include: identifying an occurrence of an update event for the endpoint device; based on the occurrence of the update event: identifying a goal operating state for the endpoint device; obtaining an endpoint device profile for the endpoint device; obtaining, using the endpoint device profile, subscription information for the endpoint device; dynamically synthesizing an action set based on the goal operating state, the subscription information, and telemetry information for the endpoint device from the endpoint device profile; and initiating updating of the endpoint device using the action set.

The action set may be dynamically synthesized using the subscription information and the telemetry information to exclude at least a portion of possible actions.

The action set may be further dynamically synthesized using the goal operating state to identify all the possible actions.

The telemetry information may indicate hardware components of the endpoint device.

The subscription information may indicate services that are to be provided to a user of the endpoint device.

The update event may be a change in subscription by a user of the endpoint device.

Initiating the updating may include: sending the action set to a management controller of the endpoint device via an out of band management channel.

The endpoint device may include a network module adapted to separately advertise network endpoints for the management controller and hardware resources of the endpoint device, the network endpoints being usable by a remote server to address communications to the hardware resources and the management controller.

The management controller and the network module may be on separate power domains from the hardware resources so that the management controller and the network module are operable while the hardware resources are inoperable.

The out of band communication channel may run through the network module, and an in band communication channel that services the hardware resources may also run through the network module.

The network module may host a transmission control protocol/internet protocol (TCP/IP) stack to facilitate network communications via the out of band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1B:
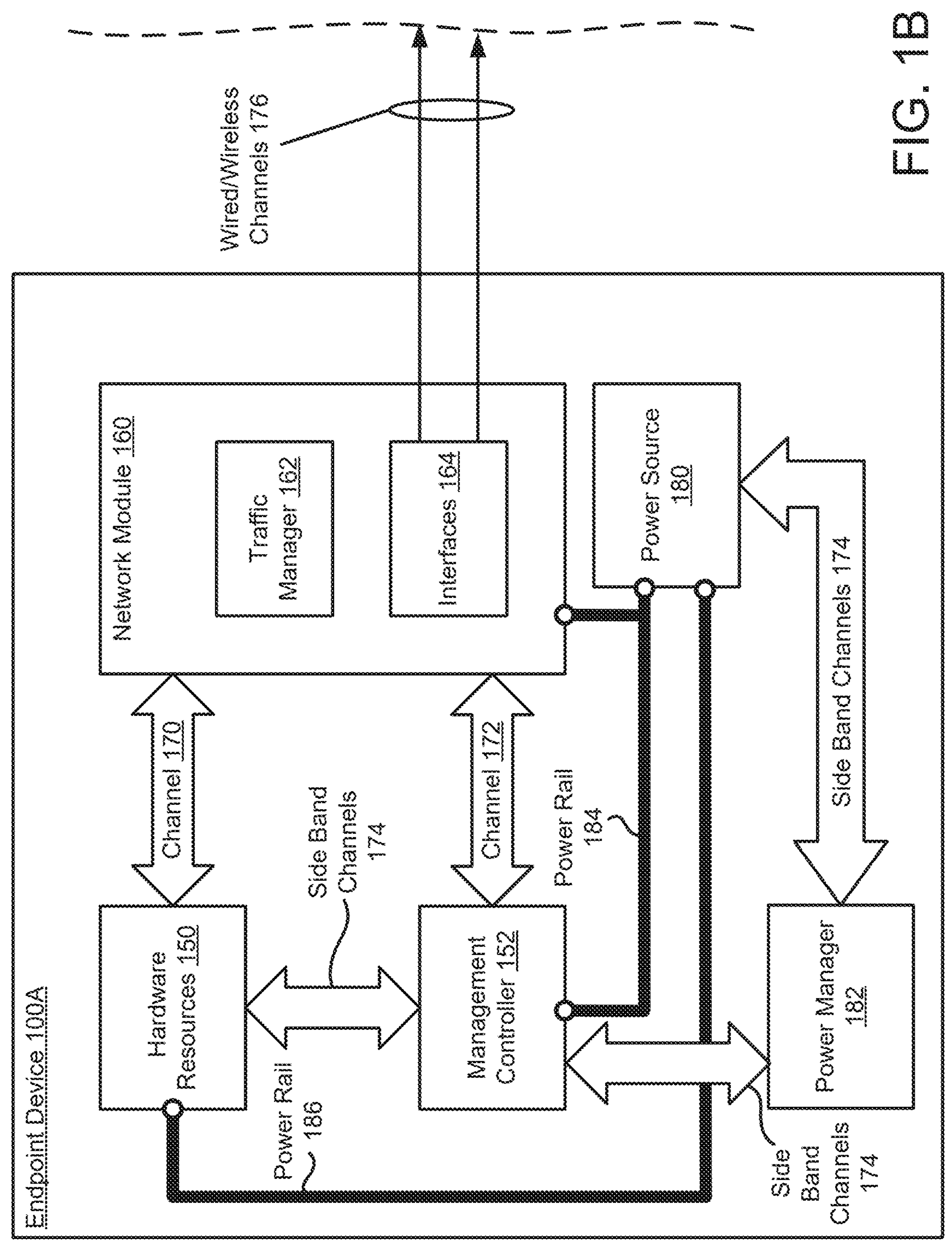
FIG. 1B shows a block diagram illustrating an endpoint device in accordance with an embodiment.

Turning to FIG. 1A, a block diagram illustrating a distributed environment (e.g., system) in accordance with an embodiment is shown. The system shown in FIG. 1A may provide for management of endpoint devices that may provide, at least in part, computer-implemented services. The system may include any number of endpoint devices 100 (e.g., computing devices) that may each include hardware components (e.g., processors, memory modules, storage devices, communications devices). The hardware components may be part of hardware resources of the endpoint devices and may support execution of any number and types of applications (e.g., software components). Refer to FIG. 1B for additional details regarding the endpoint devices.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, endpoint devices 100, remote server 102 and/or any other type of devices (not shown in FIG. 1A). Other types of computer-implemented services may be provided by the system shown in FIG. 1A without departing from embodiments disclosed herein.

To provide the aforementioned computer-implemented services, any of endpoint devices 100 (e.g., 100A, 100N) may need to operate in a predetermined manner. For example, endpoint devices 100 may each include any quantity of hardware resources. These hardware resources may include in-band hardware components (e.g., processors, memory modules, storage devices, communications devices) whose respective operations may facilitate various functionalities of endpoint devices 100, thereby causing the computer-implemented services to be provided.

Furthermore, a type and/or a quantity of the computer-implemented services may depend on functionalities facilitated by a specific operation. For example, operation of a hardware component may support execution of applications (e.g., software components) hosted by endpoint device 100A, a type and/or a quantity of the applications being based on the operation.

Over time, the desired functionality to be provided by an endpoint device (e.g., data processing system) may change. To change the type and/or the quantity of the computer-implemented services provided by the endpoint device, an update event may occur to update the operation of the endpoint device. By updating the operation, different functionalities may be facilitated, thereby causing a different type and/or quantity of the computer-implemented services to be provided.

For example, a user of an endpoint device (100A) may hold a particular role within a company. The user may be provided with endpoint device 100A and any number of subscriptions for services (e.g., software entitlements) by their employer. The subscriptions may change over time due to different types of computer-implemented services desired by the user and/or the user's employer. Specifically, the user's role within the company may change, the user's employer may modify software accessed by the user while operating endpoint device 100A, and/or other changes may occur.

To respond to the update event, data structures and/or other information may be obtained by endpoint device 100A. The data structures may include instructions for downloading software, instructions for modifying configurations of hardware components, instructions for modifying configurations of software components, etc. A management agent (e.g., a management software component) hosted by the hardware resources may be responsible for implementing the instructions to update operation of endpoint device 100A.

However, the management agent may be unable to update the operation of endpoint device 100A, which may negatively impact and/or interrupt provision of the computer-implemented services. As a first example, the management agent may be an in band component of endpoint device 100A and, therefore, may be vulnerable to compromise by malicious entities. For example, if any hardware components of the hardware resources (e.g., other in band components) are compromised, the management agent may become compromised due to trusting communications received via in band communication channels of endpoint device 100A.

In a second example, the management agent may attempt to download and/or install a software application based on an updated subscription for the user. The software application may be incompatible with hardware components of the hardware resources and, therefore, may be unable to be installed by the management agent. This may occur if the user purchases a new computer, downloads a new operating system that is not compatible with the software application, etc.

In a third example, the management agent may attempt to download and/or install a software application based on an updated subscription for the user. However, the user may not have an active subscription for the software application and, therefore, the management agent may be unable to install the software application.

While described above with respect to downloading and installing software, updating the operation of endpoint device 100A may include other actions to configure an environment through which the user may interact with endpoint device 100A without departing from embodiments disclosed herein.

In general, embodiments disclosed herein relate to systems, devices, and methods for managing operation of endpoint devices using out of band methods so that hardware and/or software components of the endpoint devices may be modified regardless of a power or operational state of the endpoint devices. Endpoint devices 100 may include out of band components (e.g., a management controller) that may communicate with remote systems (e.g., remote server 102) without traversing in band communication channels and without utilizing the in band components of endpoint devices 100 (e.g., hardware resources of endpoint devices 100).

The operation of an endpoint device (e.g., 100A) may be updated in response to an update event. An update event may occur, for example, if a subscription (e.g., for a software application) changes for a user of endpoint device 100A.

For example, a user may be an employee that holds a particular role within a company. The role may be associated with certain software permissions and the company may purchase subscriptions for those software applications for the user. Over time, software applications used by the user may change (e.g., the user may be promoted to a new role with new responsibilities, the company may change software applications used by employees). When the software applications used by the user change, the subscriptions may change and, therefore, an update event may occur.

In response to the update event, remote server 102 may interact with the management controller of endpoint device 100A to update the operation of endpoint device 100A. To do so, remote server 102 may obtain, via an out of band communication channel that does not traverse any in band components of endpoint device 100A, an endpoint device profile for endpoint device 100A. The endpoint device profile may include information related to a user of endpoint device 100A (e.g., an identifier) and telemetry information for endpoint device 100A.

Remote server may identify subscription information for the user using the identifier for the user and may dynamically synthesize an action set based on the subscription information, the telemetry information, and a goal operating state for endpoint device 100A. The action set may include any number of actions to be performed in order to update the operation of endpoint device 100A.

The goal operating state for endpoint device 100A may include a set of software subscriptions, a set of configurations for hardware and/or software components of endpoint device 100A, and/or any other information usable to configure an environment through which the user will interact with endpoint device 100A.

The goal operating state may be determined, for example, by the employer of the user and the goal operating state may be implemented using different environments for different endpoint devices. Specifically, a first user and a second user may hold the same role within the company but may utilize endpoint devices with different hardware components, different operating systems, different security limitations, etc. Therefore, the action set may be customized by remote server 102 to reduce a difference between a resulting operating state (e.g., an operating state of an endpoint device following performance of the action set) and the goal operating state.

To dynamically synthesize the action set, remote server 102 may utilize the subscription information and the telemetry information (e.g., including information related to hardware components of endpoint device 100A) to exclude possible actions from the action set. Any number of the possible actions may be excluded due to incompatibility with the hardware components of endpoint device 100A and/or the active subscriptions for the user of endpoint device 100A.

Remote server 102 may then use the goal operating state to identify all remaining possible actions and may generate the action set. The action set may include all of the remaining possible actions, may include a portion of the remaining possible actions, etc.

Remote server 102 may provide the action set to the management controller via the out of band communication channel along with instructions for the management controller to oversee performance of the action set.

The management controller may oversee (e.g., manage) the performance of the action set by directly modifying configurations of hardware and/or software components, downloading software installation packages, providing the software installation packages to the hardware resources, etc.

To perform the above-mentioned functionality, the system of FIG. 1A may include endpoint devices 100, remote server 102, and/or other components. Endpoint devices 100, remote server 102, and/or any other type of devices not shown in FIG. 1A may perform all, or a portion of the computer-implemented services independently and/or cooperatively. Each of these components is discussed below.

Endpoint devices 100 may include any number and/or type of endpoint devices (e.g., 100A-100N). Any of endpoint devices 100 may include in band components (e.g., hardware resources), out of band components (e.g., a management controller) and functionality that may allow the out of band components to interact with remote systems independently from the in band components. For more information regarding in band and out of band components of endpoint devices 100, refer to the discussion of FIG. 1B.

Remote server 102 may be implemented using physical devices located remote to endpoint devices 100 that monitor operation of endpoint devices 100. Remote server 102 may communicate with endpoint device 100A by directing communications to network endpoints associated with the management controller (e.g., via an out of band communication channel) and/or the hardware resources (e.g., via an in band communication channel).

Remote server 102 may monitor update events for endpoint devices 100 and may interact with endpoint devices 100 to synthesize action sets usable to update the operation of endpoint devices 100. As an example, remote server 102 may: (i) identify an occurrence of an update event for endpoint device 100A, (ii) in response to the update event, identify a goal operating state for endpoint device 100A, (iii) obtain an endpoint device profile for endpoint device 100A, (iv) obtain, using the endpoint device profile, subscription information for the endpoint device, (v) dynamically synthesize an action set based on the goal operating state, the subscription information, and telemetry information for endpoint device 100A from the endpoint device profile, (vi) initiate updating of endpoint device 100A using the action set, and/or (vii) perform other actions.

Figure 2A:
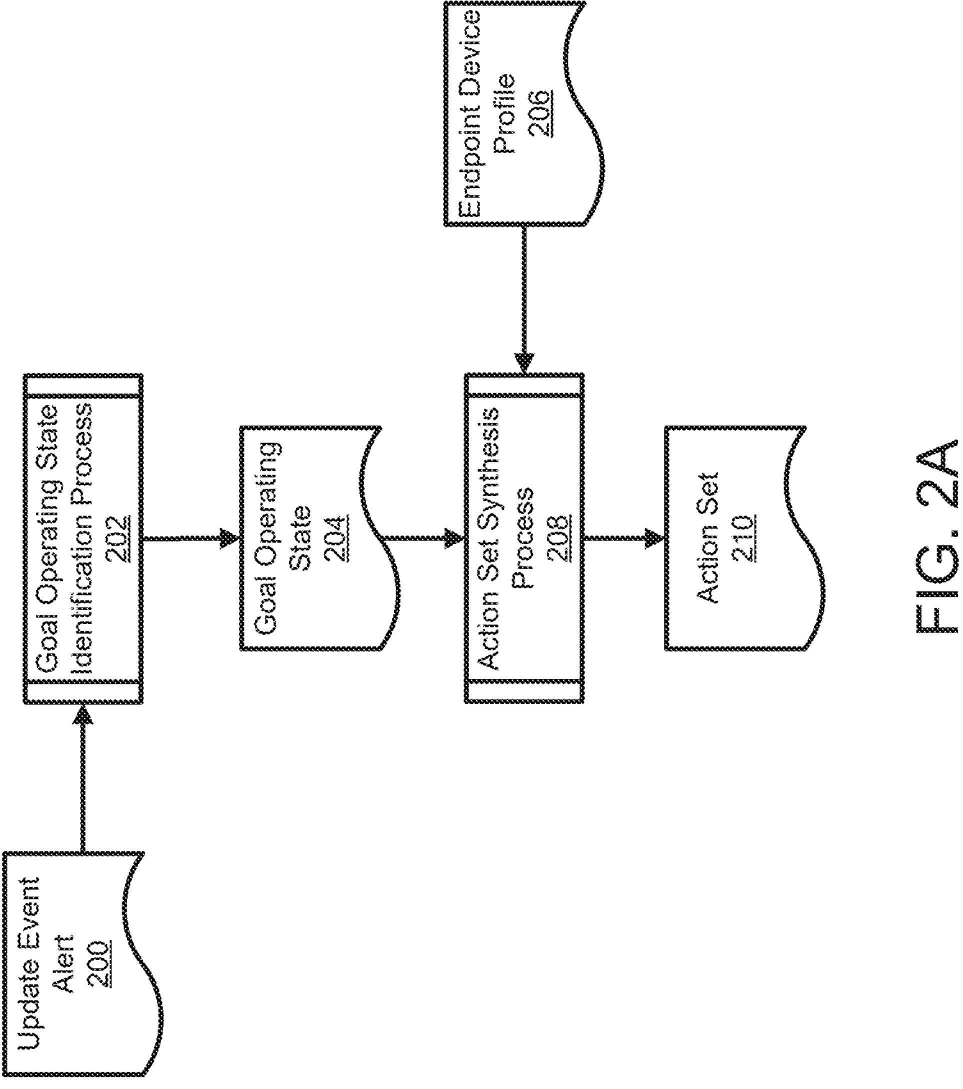
FIG. 2A shows a data flow diagram illustrating management of operation of an endpoint device in accordance with an embodiment.
Figure 2B:
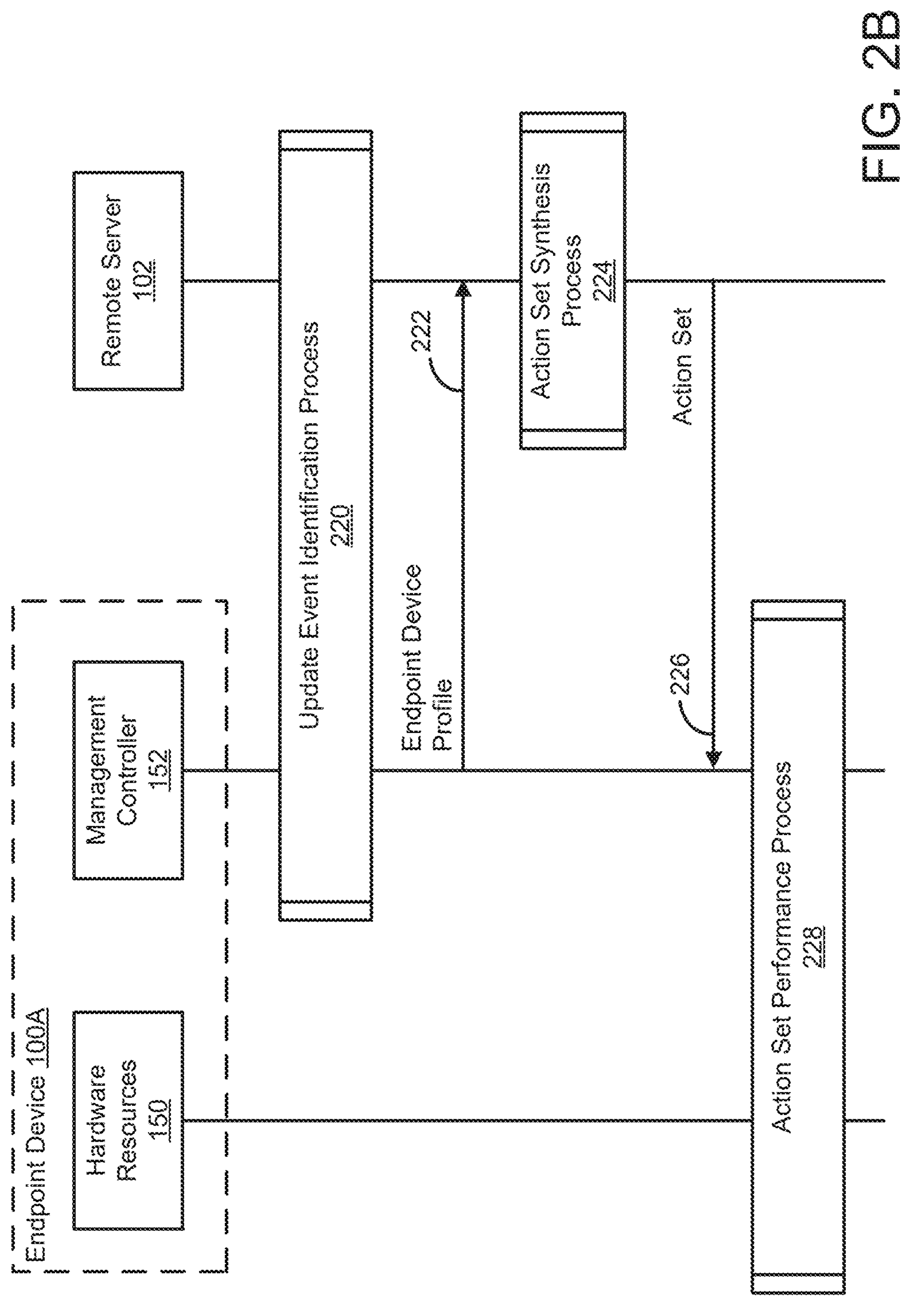
FIG. 2B shows an interaction diagram in accordance with an embodiment.
Figure 3:
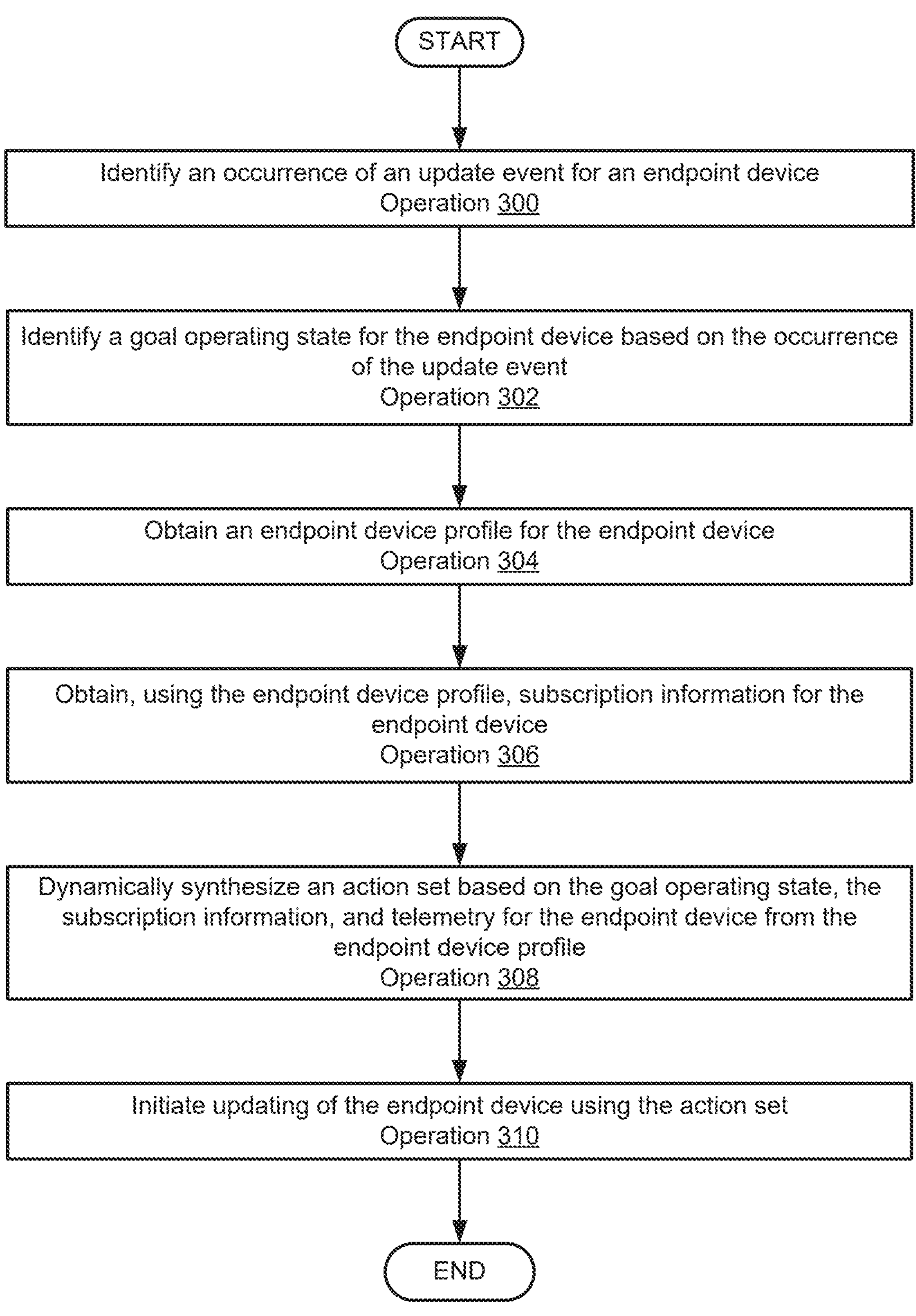
FIG. 3 shows a flow diagram illustrating a method of managing operation of an endpoint device in accordance with an embodiment.

When providing their functionality, any of endpoint devices 100, remote server 102, and/or other devices may perform all, or a portion of the methods shown in FIGS. 2A-3.

Any of (and/or components thereof) endpoint devices 100, and/or remote server 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of endpoint devices 100 and/or remote server 102 are implemented using an internet of things (IoT) device, which may include a computing device. The IoT device may operate in accordance with a communication model and/or management model known to endpoint devices 100, remote server 102, and/or other devices.

Any of the components illustrated in FIG. 1A may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and/or types of communication protocols (e.g., such as the internet protocol).

Communication system 104 may be implemented with one or more local communications links (e.g., a bus interconnecting a processor of any of endpoint devices 100 and remote server 102).

Communication system 104 may include out of band communication channels, in band communication channels, and/or other types of communication channels.

Refer to FIG. 1B for additional details regarding the management controller, network module, out of band communication channel, and/or hardware resources of endpoint devices 100.

While illustrated in FIG. 1A as including a limited number of specific components, a system in accordance with an embodiment may include fewer, additional, and/or different components than those illustrated therein.

Turning to FIG. 1B, a diagram illustrating endpoint device 100A in accordance with an embodiment is shown. Endpoint device 100A may be similar to any of endpoint devices 100 described in FIG. 1A.

To provide computer-implemented services, endpoint device 100A may include any quantity of hardware resources 150. Hardware resources 150 may be in band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of endpoint device 100A) to another device via any number of intermediate networks (e.g., via wired/wireless channels 176 that are part of the networks).

To reduce the downtime of endpoint device 100A and to reduce the likelihood of the applications and/or other in band entities from being indirectly compromised, endpoint device 100A may include management controller 152 and network module 160. Each of these components of endpoint device 100A is discussed below.

Management controller 152 may be implemented, for example, using a system on a chip or other type of independently operating computing device (e.g., independent from the in band components, such as hardware resources 150, of a host endpoint device 100A). Management controller 152 may provide various management functionalities for endpoint device 100A. For example, management controller 152 may monitor various ongoing processes performed by the in band components, may manage power distribution, thermal management, and/or other functions of endpoint device 100A.

To do so, management controller 152 may be operably connected to various components via side band channels 174 (in FIG. 1B, a limited number of side band channels are included for illustrative purposes, it will be appreciated that management controller 152 may communicate with other components via any number of side band channels). The side band channels may be implemented using separate physical channels, and/or with a logical channel overlay over existing physical channels (e.g., logical division of in band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

For example, software applications hosted by hardware resources 150 may be updated over time and management controller 152 may facilitate these updates. To do so, management controller 152 may provide, via side band channels 174, instructions to hardware resources 150 to install software applications, update configurations of hardware and/or software components, etc.

Management controller 152 may be operably connected to communication components of endpoint device 100A via separate channels (e.g., 172) from the in band components, and may implement or otherwise utilize a distinct and independent network stack (e.g., TCP/IP). Consequently, management controller 152 may communicate with other devices independently of any of the in band components (e.g., does not rely on any hosted software, hardware components, etc.). Accordingly, compromise of any of hardware resources 150 and hosted components may not result in indirect compromise of management controller 152, and entities hosted by management controller 152.

For example, management controller 152 may interact with a remote entity to facilitate updates to the operation of endpoint device 100A via an out of band communication channel (e.g., 172). Management controller 152 may provide information related to a user of endpoint device 100A and telemetry information (e.g., hardware components of hardware resources 150) to the remote entity and may receive an action set from the remote entity. The action set may be usable by management controller 152 to update the operation of endpoint device 100A. By interacting with the remote entity via the out of band communication channel, the information exchanged between management controller 152 and the remote entity may not traverse any potentially compromised in band components of endpoint device 100A.

To facilitate communication with other devices, endpoint device 100A may include network module 160. Network module 160 may provide communication services for in band components and out of band components (e.g., management controller 152) of endpoint device 100A. For example, network module 160 may host a TCP/IP stack to facilitate network communications via at least an out of band communication channel and an in band communication channel. To do so, network module 160 may include traffic manager 162 and interfaces 164.

Traffic manager 162 may include functionality to (i) discriminate traffic directed to various network endpoints advertised by endpoint device 100A, and (ii) forward the traffic to/from the entities associated with the different network endpoints. For example, to facilitate communications with other devices, network module 160 may advertise different network endpoints (e.g., different media access control address/internet protocol addresses) for the in band components and out of band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Channel 170 may include an in band communication channel that services hardware resources 150 and channel 172 may include an out of band communication channel that services out of band components (e.g., management controller 152). Channel 170 and channel 172 may run through network module 160.

Accordingly, traffic directed to management controller 152 may never flow through any of the in band components. Likewise, outbound traffic from the out of band component may never flow through the in band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wireless wide area network (WWAN) card, a WiFi card, a wireless local area network card, a wired local area network card, an optical communication card, and/or other types of communication components. These components may support any number of wired/wireless channels 176.

Network module 160 (e.g., via interfaces 164) may separately advertise network endpoints for management controller 152 and hardware resources 150. Thus, from the perspective of an external device, the in band components and out of band components of endpoint device 100A may appear to be two independent network entities, that may independently addressable, and otherwise unrelated to one another.

To facilitate management of endpoint device 100A over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, endpoint device 100A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails (e.g., by providing instructions via side band channels 174).

Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, endpoint device 100A may perform all, or a portion, of the methods and operations illustrated in FIGS. 2A-3.

While illustrated in FIG. 1B with a limited number of specific components, a system may include additional, fewer, and/or different components without departing from embodiments disclosed herein.

As discussed above, the components of FIGS. 1A-1B may perform various methods to manage operation of endpoint devices that perform computer-implemented services. FIGS. 2A-3 may illustrate examples of methods that may be performed by the components of FIGS. 1A-1B. In the diagrams discussed below and shown in FIGS. 2A-3, any of the operations may be repeated, performed in different orders, and/or performed in parallel with or in a partially overlapping in time manner with other operations.

To further clarify embodiments disclosed herein, a data flow diagram in accordance with an embodiment is shown in FIG. 2A. In this diagram, flows of data and processing of data are illustrated using different sets of shapes. A first set of shapes (e.g., 200, 204, etc.) is used to represent data structures and a second set of shapes (e.g., 202, 208, etc.) is used to represent processes performed using and/or that generate data.

Turning to FIG. 2A, a data flow diagram in accordance with an embodiment is shown. The data flow diagram may illustrate data used in and data processing performed in managing operation of endpoint devices.

Consider an example in which a user of an endpoint device (e.g., 100A described in FIGS. 1A-1B) holds a particular role within a company. To perform their job, the user may access various software applications and the user's employer may provide subscriptions for these software applications for the user. Over time, the user's role within the company may change, desired software applications for the user to perform their job functions may change, and/or other changes may occur that may impact the subscriptions.

If the subscriptions for the user change, update event alert 200 may be generated. Update event alert 200 may include any type and/or quantity of information indicating that an update event has occurred for endpoint device 100A. Update event alert 200 may be generated by the user, may be generated by a third party (e.g., the user's employer) and/or may be generated by any entity responsible for monitoring subscriptions and/or other causes of update events for endpoint devices.

Update event alert 200 may include, for example, information indicating a type of update event (e.g., a change in subscription by the user), a timestamp for the update event, an identifier for endpoint device 100A and/or the user of endpoint device 100A, etc. Update event alert 200 may be provided to any entity responsible for managing responses to update events.

For example, the user's employer may generate update event alert 200 and may provide update event alert 200 to an entity responsible for managing update events.

To determine a goal operating state for endpoint device 100A and, therefore, desired functionalities for use by the user, goal operating state identification process 202 may be performed. During goal operating state identification process 202, information included in update event alert 200 may be read, queries may be provided to other entities for additional information, and/or other actions may be performed to obtain goal operating state 204.

Goal operating state 204 may include any type and/or quantity of data related to desired operation of endpoint device 100A. For example, goal operating state 204 may include a list of subscriptions for the user of endpoint device 100A, may include any number of preferred configurations for hardware and/or software components of endpoint device 100A, and/or any other information indicating an environment through which the user may interact with endpoint device 100A to provide and/or receive computer-implemented services.

Goal operating state 204 may, therefore, include a list of goals (e.g., software installation goals, configuration goals) that may or may not be compatible with individual constraints associated with endpoint device 100A. For example, endpoint device 100A may have particular hardware components and/or software applications (e.g., operating systems, management entities) that are not compatible with at least a portion of the goals included in goal operating state 204.

To generate an action set usable to modify operation of endpoint device 100A, action set synthesis process 208 may be performed. During action set synthesis process 208, goal operating state 204 and endpoint device profile 206 may be used to generate action set 210.

Endpoint device profile 206 may include any type and/or quantity of data related to endpoint device 100A and the user of endpoint device 100A. For example, endpoint device profile 206 may include: (i) an identifier for the user of endpoint device 100A, (ii) telemetry information for endpoint device 100A, the telemetry information indicating hardware components of endpoint device 100A, and/or (iii) other information.

The identifier for the user of endpoint device 100A may be any series of numbers and/or letters usable to identify the user (e.g., a name, an employee identification number). The telemetry information may include, for example, a list of hardware components (e.g., processors, memory modules, storage devices) included in endpoint device 100A, a list of configurations of hardware and/or software components of endpoint device 100A, etc. The telemetry information may include any other information that may limit actions to be performed to update the operation of endpoint device 100A.

During action set synthesis process 208, any number of actions may be added to action set 210 from a list of possible actions. Doing so may include: (i) using the identifier for the user of endpoint device 100A to identify active subscriptions (e.g., services that are to be provided) for the user, (ii) comparing the list of the active subscriptions to a list of desired subscriptions included in goal operating state 204, and/or (ii) determining whether to exclude any possible actions based on the telemetry information, the subscription information, and goal operating state 204.

If any actions are to be excluded, these actions are not to be added to action set 210 and any number of actions that are not included in the excluded actions may be added to action set 210. If no actions are to be excluded, any number of the possible actions are to be added to action set 210. For example, all of the possible actions may be added to action set 210, a portion of the possible actions may be added to action set 210, etc.

Action set 210 may include any amount and/or quantity of data related to an action set usable to place endpoint device 100A in an operating state that fulfills goal operating state 204 as closely as possible based on constraints identified using endpoint device profile 206. For example, the actions included in action set 210 may exclude one or more configurations and/or software installations listed in goal operating state 204 that are incompatible with endpoint device 100A. To differentiate different actions, action set 210 may be organized as, for example, a list of commands, instructions, etc. The actions may be provided to any entity with authority to modify the operation of endpoint device 100A.

By synthesizing an action set usable to update the operation of endpoint device 100A based on goal operating state 204 and endpoint device profile 206, a likelihood of the action set being successfully performed may be increased. Doing so may take into account desired functionalities for endpoint device 100A and applicable hardware and/or software constraints that may potentially prevent implementation of at least a portion of the desired functionalities.

In addition, action set 210 may be obtained by endpoint device 100A using out of band methods thereby bypassing potentially compromised hardware resources (e.g., in band components) of endpoint device 100A. By doing so, the operation of endpoint device 100A may be updated regardless of a state (e.g., a power state, a compromise state) of endpoint device 100A.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

To further clarify embodiments disclosed herein, an interaction diagram in accordance with an embodiment is shown in FIG. 2B. The interaction diagram may illustrate an example of how data may be obtained and used within the systems of FIGS. 1A-1B.

In the interaction diagram, processes performed by and interactions between components of a system in accordance with an embodiment are shown. In the diagram, components of the system are illustrated using a first set of shapes (e.g., 150, 152, etc.), located towards the top of each figure. Lines descend from these shapes. Processes performed by the components of the system are illustrated using a second set of shapes (e.g., 220, 228) superimposed over these lines.

Interactions (e.g., communication, data transmissions, etc.) between the components of the system are illustrated using a third set of shapes (e.g., 222, 226, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 222 may occur prior to the interaction labeled as 226. However, it will be appreciated that the processes and interactions may be performed in different orders, any may be omitted, and other processes or interactions may be performed without departing from embodiments disclosed herein.

The processes shown in FIG. 2B may be performed by any entity shown in the systems of FIGS. 1A-1B (e.g., a device similar to one of endpoint devices 100, systems similar to remote server 102, any component of a device similar to one of endpoint devices 100, etc.) and/or another entity without departing from embodiments disclosed herein.

Turning to FIG. 2B, an interaction diagram in accordance with an embodiment is shown. The interaction diagram may illustrate processes and interactions that may occur when managing operation of an endpoint device.

To manage the operation of endpoint device 100A, management controller 152 and remote server 102 may perform update event identification process 220. During update event identification process 220, an entity (e.g., management controller 152, remote server 102) may receive a notification that an update event has occurred for endpoint device 100A. The notification that the update event has occurred may be a data structure (e.g., a message) similar to update event alert 200 described in FIG. 2A.

For example, during update event identification process 220, remote server 102 may receive a notification of a change in a subscription by a user of endpoint device 100A. The change in the subscription may be initiated by the user, by a third party (e.g., the user's employer), and/or another entity. The subscription may be a subscription for access to a software application (e.g., a software entitlement) and/or another type of subscription.

During update event identification process 220, remote server 102 may also obtain a goal operating state for endpoint device 100A. The goal operating state may be similar to goal operating state 204 described in FIG. 2A. Remote server 102 may receive the goal operating state, for example, from the user's employer.

During update event identification process 220, remote server 102 may request, in response to obtaining the update event notification, an endpoint device profile from endpoint device 100A via an interaction with management controller 152 (not shown).

At interaction 222, the endpoint device profile requested by remote server 102 during update event identification process 220 may be provided to remote server 102 by management controller 152. For example, the endpoint device profile may be generated and provided to remote server 102 via (i) transmission via a message, (ii) storing in a storage with subsequent retrieval by remote server 102, (iii) via a publish-subscribe system where remote server 102 subscribes to updates from management controller 152 thereby causing a copy of the endpoint device profile to be propagated to remote server 102, and/or via other processes. By providing the endpoint device profile to remote server 102, management controller 152 may provide information usable to synthesize an action set to update the operation of endpoint device 100A. The endpoint device profile may be similar to endpoint device profile 206 described in FIG. 2A.

To synthesize an action set usable to place endpoint device 100A in an operating state (e.g., a resulting operating state) based on the goal operating state and the endpoint device profile, remote server 102 may perform action set synthesis process 224. The resulting operating state may match the goal operating state, may lack one or more components of the goal operating state, etc.

During action set synthesis process 224, remote server 102 may: (i) obtain user information for the user of endpoint device 100A using the endpoint device profile, (ii) obtain subscription information (e.g., information indicating services that are to be provided to the user) for the user using the user information, (iii) obtain telemetry information from the endpoint device profile, (iv) dynamically synthesize an action set using the subscription information and the telemetry information, (v) further dynamically synthesize the action set using the goal operating state to identify all the possible actions, and/or (vi) perform other actions. Action set synthesis process 224 may be similar to action set synthesis process 208 described in FIG. 2A.

By performing action set synthesis process 224, remote server 102 may obtain an action set. The action set may be determined using an optimization process to potentially exclude one or more possible actions based on the telemetry information (e.g., hardware components of endpoint device 100A) and the subscription information (e.g., active entitlements for the user). Therefore, dynamically synthesizing the action set may include attempting to reduce a difference between the resulting operating state and the goal operating state.

At interaction 226, the action set generated during action set synthesis process 224 may be provided to management controller 152 by remote server 102. For example, the action set may be generated and provided to management controller 152 via (i) transmission via a message, (ii) storing in a storage with subsequent retrieval by management controller 152, (iii) via a publish-subscribe system where management controller 152 subscribes to updates from remote server 102 thereby causing a copy of the action set to be propagated to management controller 152, and/or via other processes. By providing the action set to management controller 152, remote server 102 may provide information usable to modify operation of endpoint device 100A.

The action set may be similar to action set 210 described in FIG. 2A. Remote server 102 may provide the action set to management controller 152 via an out of band communication channel.

To modify the operation of endpoint device 100A, management controller 152 and hardware resources 150 may perform action set performance process 228. During action set performance process 228, management controller 152 may initiate performance of one or more actions included in the action set. The actions may include: (i) downloading data usable to install software applications, (ii) providing instructions to hardware resources 150 to install the software applications, (iii) directly modifying configurations of hardware and/or software components of hardware resources 150, and/or (iv) other actions.

Management controller 152 may provide instructions and/or may interact with hardware resources 150 using any number of side band communication channels of endpoint device 100A.

By modifying an operating state of endpoint device 100A using out of band methods, remote server 102 may obtain an action set tailored to the endpoint device profile (e.g., hardware component constraints, an updated list of active subscriptions for the user). Consequently, a likelihood of successful performance of the actions included in the action set may be increased. In addition, by utilizing out of band methods (e.g., the management controller, the out of band communication channel), the operating state of endpoint device 100A may be updated regardless of a power or compromise state of endpoint device 100A thereby increasing a likelihood of modifying the operating state of the endpoint device in the event of malicious activity.

As discussed above, the components of FIGS. 1A-2B may perform various methods to manage operation of endpoint devices using out of band methods. By doing so, a quality and/or reliability of the computer-implemented services may be increased.

Turning to FIG. 3, a flow diagram illustrating a method of managing operating of an endpoint device in accordance with an embodiment is shown. In the diagram discussed below and shown in FIG. 3, any of the operations may be repeated, performed in different orders, and/or performed in parallel with or in a partially overlapping in time manner with other operations. The method described with respect to FIG. 3 may be performed by an endpoint device, any component of an endpoint device (e.g., a management controller, hardware resources), a remote server, and/or another device.

At operation 300, an occurrence of an update event for an endpoint device may be identified. Identifying the occurrence of the update event may include: (i) receiving a notification that the update event has occurred (e.g., as a message over a communication system), (ii) reading the notification that the updated event has occurred from storage, (iii) receiving, via a human interface device (HID) feedback from a user of the endpoint device indicating a request for a subscription change and/or other modification that may trigger the occurrence of the update event, and/or (iv) other methods.

At operation 302, a goal operating state for the endpoint device may be identified based on the occurrence of the update event. Identifying the goal operating state for the endpoint device may include: (i) reading the goal operating state from storage, (ii) receiving the goal operating state (e.g., as a message) from another entity, (iii) generating the goal operating state via prompting a user to enter information related to the goal operating state using HIDs of the endpoint device, and/or (iv) other methods. Refer to FIGS. 2A-2B for additional details regarding the goal operating state.

At operation 304, an endpoint device profile for the endpoint device may be obtained. Obtaining the endpoint device profile may include: (i) reading the endpoint device profile from storage, (ii) receiving the endpoint device profile from another entity (e.g., as a message over a communication system), (iii) generating the endpoint device profile, and/or (iv) other methods.

Generating the endpoint device profile may include: (i) obtaining telemetry information for the endpoint device (e.g., a list of hardware components, a list of configuration of hardware and/or software components, a log of recent events for the endpoint device), (ii) obtaining an identifier for the user of the endpoint device, (iii) compiling at least the telemetry information and the identifier for the user into a data structure, and/or (iv) other methods.

At operation 306, subscription information for the endpoint device may be obtained using the endpoint device profile. Obtaining the subscription information for the endpoint device may include: (i) reading the subscription information from storage, (ii) receiving the subscription information from another entity (e.g., as a message over a communication system), (iii) performing a lookup process using a subscription information lookup table and the identifier for the user as a key for the subscription information lookup table, (iv) providing the identifier for the user to another entity responsible for retrieving the subscription information (e.g., by transmitting as a message over a communication system), and/or (v) other methods.

At operation 308, an action set may be dynamically synthesized based on the goal operating state, the subscription information, and telemetry information for the endpoint device from the endpoint device profile. Dynamically synthesizing the action set may include: (i) obtaining a list of all possible actions based on the goal operating state for the endpoint device, the list of the all possible actions including actions performable to meet goals included in the goal operating state, (ii) excluding at least a portion of actions included in the list of the all possible actions based on the telemetry information, (iii) generating the action set based on the goal operating state and actions that were not excluded from the list of the all possible actions, and/or (iv) other methods.

Excluding at least the portion of actions included in the list of the all possible actions may include, for each action of the all possible actions: (i) identifying a list of hardware components compatible with the action, (ii) comparing the list of the compatible hardware components to a list of the available hardware components included in the telemetry information of the endpoint device profile, (iii) identifying one or more subscriptions compatible with the action, (iv) comparing the one or more compatible subscriptions with the subscription information obtained using the endpoint device profile, (v) determining whether to exclude the action, and/or (vi) other methods.

Determining whether to exclude the action may include: (i) obtaining a first difference between the list of hardware components compatible with the action and list of the available hardware components, (ii) obtaining a second difference between the subscriptions compatible with the action and the subscription information, (iii) comparing the first difference and the second difference to one or more thresholds, and/or (iv) if the first difference and/or the second difference meets the one or more thresholds, determining that the action is to be excluded.

For example, a first action may include: (i) downloading an installation package for a software application and (ii) installing the software application using the installation package. To determine whether to exclude the first action, it may be determined whether the user has an active subscription for the software application. The subscription information may include a list of active subscriptions for the user. If the software application is not included in the list of the active subscriptions, the first action may be excluded.

Generating the action set based on the goal operating state and the actions that were not excluded from the list of all the possible actions may include performing an optimization process to increase a likelihood of meeting the goal operating state upon performance of the action set. For example, a first action (e.g., installation of a software application) may have been excluded from the list of all the possible actions due to a lack of an active subscription for the software application. In response to the exclusion of the first action, one or more actions may be added to the action set to attempt to meet the goal operating state. The one or more actions that may be added may include: (i) installation of a second software application that performs a similar function and that the user has an active subscription for, (ii) submitting a request for the user to subscribe to the software application, and/or (iii) other actions.

At operation 310, updating of the endpoint device may be initiated using the action set. Initiating updating of the endpoint device may include sending the action set to a management controller of the endpoint device via an out of band communication channel.

Sending the action set to the management controller of the endpoint device via the out of band communication channel may include: (i) packaging the action set for transmission and labeling the packaged action set so it is directed to a network endpoint associated with the management controller, (ii) transmitting the packaged action set via a communication system to a network module of the endpoint device, and/or (iii) other methods. Sending the action set to the management controller of the endpoint device may also include providing the action set to another entity responsible for transmitting the action set to the management controller via the out of band communication channel and/or other methods.

The method may end following operation 310.

Therefore, operation of endpoint devices may be managed using out of band methods. By doing so, an environment through which a user may interact with an endpoint device (e.g., configurations of hardware and/or software components, software application subscriptions, ownership vouchers, etc.) may by dynamically configured without traversing in band components of the endpoint devices. Doing so may increase a likelihood of computer-implemented services being provided by the endpoint devices as desired by downstream consumers of the computer-implemented services.

Figure 4:
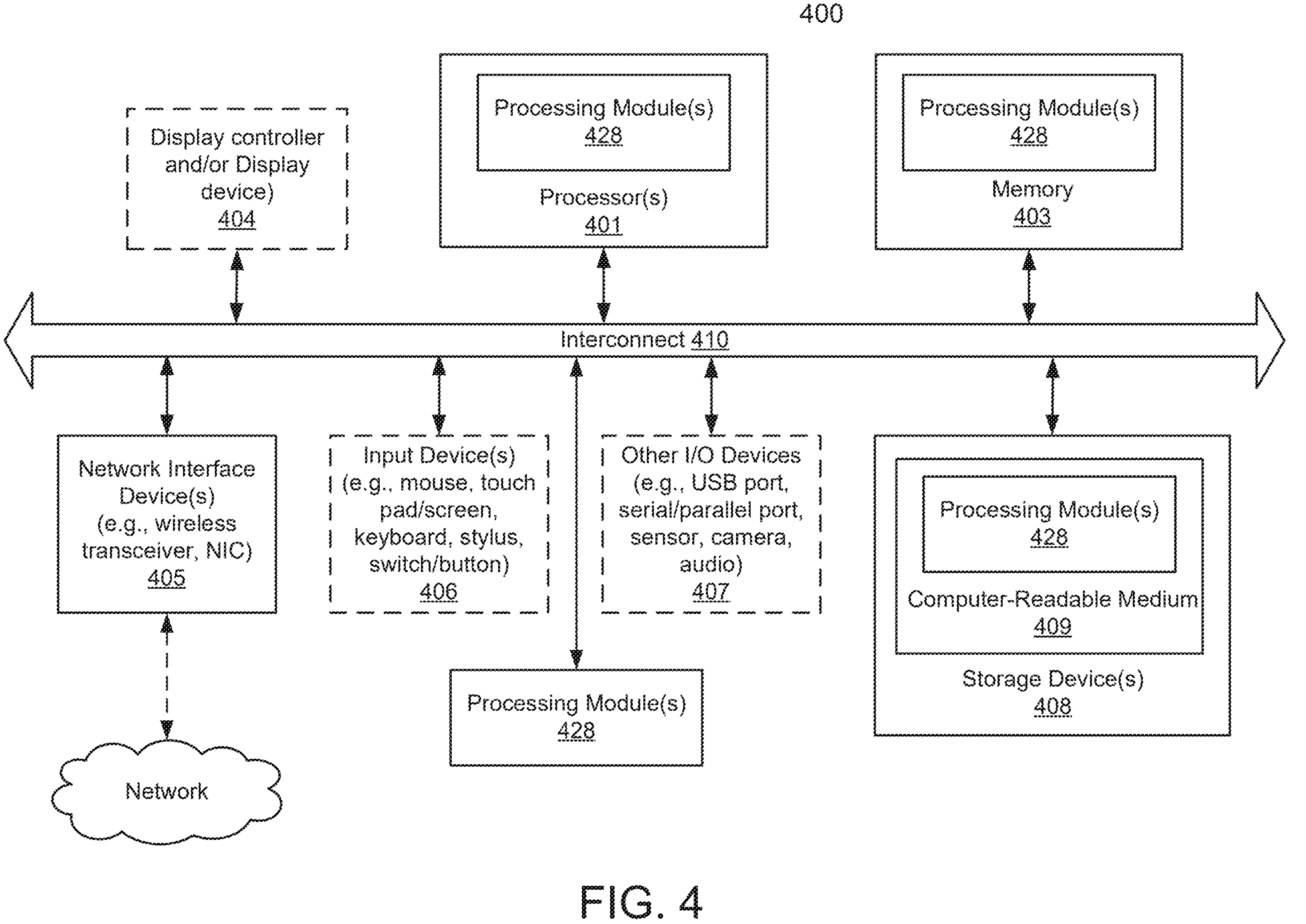
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing operation of an endpoint device, the method comprising:

receiving an update event alert indicating a change in subscription by a user of the endpoint device, the update event alert comprising a timestamp of the change in subscription and an identifier of the user of the endpoint device;

identifying, based on the update event alert, an occurrence of an update event for the endpoint device;

based on the occurrence of the update event:

identifying a goal operating state for the endpoint device, the goal operating state comprising a software installation that is incompatible with a hardware component of the endpoint device;

obtaining an endpoint device profile for the endpoint device;

obtaining, using the endpoint device profile, subscription information for the endpoint device;

obtaining a first difference between a first list of hardware components that are compatible with the software installation and a second list of available hardware components included in telemetry information of the endpoint device;

obtaining a second difference between compatible subscriptions that are compatible with the software installation and the subscription information;

comparing the first difference and the second difference with a threshold;

determining that at least one of the first difference or the second difference meets the threshold;

determining to exclude the software installation;

dynamically synthesizing an action set based on the goal operating state, the subscription information, and the telemetry information for the endpoint device from the endpoint device profile, wherein the software installation is excluded from the action set, and wherein the telemetry information indicates a limit on updating actions that can be performed; and initiating updating of the endpoint device using the action set.

2. The method of claim 1, wherein the action set is dynamically synthesized using the subscription information and the telemetry information to exclude the software installation.

3. The method of claim 2, wherein the action set is further dynamically synthesized using the goal operating state to identify all possible actions.

4. The method of claim 1, wherein the telemetry information indicates the available hardware components of the endpoint device.

5. The method of claim 1, wherein the subscription information indicates services that are to be provided to a user of the endpoint device.

6. The method of claim 1, wherein identifying the goal operating state for the endpoint device comprises:

reading information in the update event alert; and querying an entity for additional information.

7. The method of claim 1, wherein initiating the updating comprises:

sending the action set to a management controller of the endpoint device via an out of band communication channel.

8. The method of claim 7, wherein the endpoint device comprises a network module adapted to separately advertise network endpoints for the management controller and hardware resources of the endpoint device, the network endpoints being usable by a remote server to address communications to the hardware resources and the management controller.

9. The method of claim 8, wherein the management controller and the network module are on separate power domains from the hardware resources so that the management controller and the network module are operable while the hardware resources are inoperable.

10. The method of claim 8, wherein the out of band communication channel runs through the network module, and an in band communication channel that services the hardware resources also runs through the network module.

11. The method of claim 8, wherein the network module hosts a transmission control protocol/internet protocol (TCP/IP) stack to facilitate network communications via the out of band communication channel.

12. A non-transitory machine-readable medium having instructions stored therein, which when executed by a processor, cause the processor to perform operations for managing operation of an endpoint device, the operations comprising:

receiving an update event alert indicating a change in subscription by a user of the endpoint device, the update event alert comprising a timestamp of the change in subscription and an identifier of the user of the endpoint device;

identifying, based on the update event alert, an occurrence of an update event for the endpoint device;

based on the occurrence of the update event:

identifying a goal operating state for the endpoint device, the goal operating state comprising a software installation that is incompatible with a hardware component of the endpoint device;

obtaining an endpoint device profile for the endpoint device;

obtaining, using the endpoint device profile, subscription information for the endpoint device;

obtaining a first difference between a first list of hardware components that are compatible with the software installation and a second list of available hardware components included in telemetry information of the endpoint device;

obtaining a second difference between compatible subscriptions that are compatible with the software installation and the subscription information;

comparing the first difference and the second difference with a threshold;

determining that at least one of the first difference or the second difference meets the threshold;

determining to exclude the software installation;

dynamically synthesizing an action set based on the goal operating state, the subscription information, and the telemetry information for the endpoint device from the endpoint device profile, wherein the software installation is excluded from the action set, and wherein the telemetry information indicates a limit on updating actions that can be performed; and initiating updating of the endpoint device using the action set.

13. The non-transitory machine-readable medium of claim 12, wherein the action set is dynamically synthesized using the subscription information and the telemetry information to exclude the software installation.

14. The non-transitory machine-readable medium of claim 13, wherein the action set is further dynamically synthesized using the goal operating state to identify all possible actions.

15. The non-transitory machine-readable medium of claim 12, wherein the telemetry information indicates the available hardware components of the endpoint device.

16. The non-transitory machine-readable medium of claim 12, wherein the subscription information indicates services that are to be provided to a user of the endpoint device.

17. A data processing system, comprising:

a processor; and a memory coupled to the processor to store instructions, which when executed by the processor, cause the processor to perform operations for managing operation of an endpoint device, the operations comprising:

receiving an update event alert indicating a change in subscription by a user of the endpoint device, the update event alert comprising a timestamp of the change in subscription and an identifier of the user of the endpoint device;

identifying, based on the update event alert, an occurrence of an update event for the endpoint device;

based on the occurrence of the update event:

identifying a goal operating state for the endpoint device, the goal operating state comprising a software installation that is incompatible with a hardware component of the endpoint device;

obtaining an endpoint device profile for the endpoint device;

obtaining, using the endpoint device profile, subscription information for the endpoint device;

obtaining a first difference between a first list of hardware components that are compatible with the software installation and a second list of available hardware components included in telemetry information of the endpoint device;

obtaining a second difference between compatible subscriptions that are compatible with the software installation and the subscription information;

comparing the first difference and the second difference with a threshold;

determining that at least one of the first difference or the second difference meets the threshold;

determining to exclude the software installation;

dynamically synthesizing an action set based on the goal operating state, the subscription information, and telemetry information for the endpoint device from the endpoint device profile, wherein the software installation is excluded from the action set, and wherein the telemetry information indicates a limit on updating actions that can be performed; and initiating updating of the endpoint device using the action set.

18. The data processing system of claim 17, wherein the action set is dynamically synthesized using the subscription information and the telemetry information to exclude the software installation.

19. The data processing system of claim 18, wherein the action set is further dynamically synthesized using the goal operating state to identify all possible actions.

20. The data processing system of claim 17, wherein the telemetry information indicates the available hardware components of the endpoint device.

* * * * *